United States Patent
Jeong et al.

(10) Patent No.: US 10,560,730 B2
(45) Date of Patent: Feb. 11, 2020

(54) ELECTRONIC APPARATUS AND OPERATING METHOD THEREOF

(71) Applicant: SAMSUNG ELECTRONICS CO., LTD., Suwon-si, Gyeonggi-do (KR)

(72) Inventors: Da-hee Jeong, Seoul (KR); Se-hyun Kim, Daejeon (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 3 days.

(21) Appl. No.: 15/806,713

(22) Filed: Nov. 8, 2017

(65) Prior Publication Data

US 2018/0131981 A1   May 10, 2018

Related U.S. Application Data

(60) Provisional application No. 62/419,579, filed on Nov. 9, 2016.

(30) Foreign Application Priority Data

Dec. 9, 2016  (KR) .................. 10-2016-0168010
Mar. 10, 2017  (KR) .................. 10-2017-0030543

(51) Int. Cl.
*H04N 7/10* (2006.01)
*H04N 7/025* (2006.01)
(Continued)

(52) U.S. Cl.
CPC ....... *H04N 21/242* (2013.01); *H04N 21/4302* (2013.01); *H04N 21/44008* (2013.01); *H04N 21/64* (2013.01); *H04N 21/812* (2013.01)

(58) Field of Classification Search
CPC ............. H04N 21/424; H04N 21/4302; H04N 21/44008; H04N 21/64; H04N 21/812
See application file for complete search history.

(56) References Cited

U.S. PATENT DOCUMENTS 7,254,175 B2   8/2007   Hurst et al.
7,650,617 B2   1/2010   Hoshino et al.
(Continued)

FOREIGN PATENT DOCUMENTS

JP   2005-057524   3/2005
JP   2010-502143   1/2010
(Continued)

OTHER PUBLICATIONS

Search Report and Written Opinion dated Mar. 7, 2017 in counterpart International Patent Application No. PCT/KR2017/012567.
(Continued)

*Primary Examiner* — Kyu Chae
(74) *Attorney, Agent, or Firm* — Nixon & Vanderhye, P.C.

(57) ABSTRACT

An electronic apparatus and an operating method thereof are provided. The electronic apparatus includes: a communication interface comprising communication circuitry; a display; a memory configured to store one or more instructions; and a processor configured to execute the one or more instructions, the instructions, when executed by the processor, cause the electronic apparatus to: transmit, to an external server, information for recognition of content displayed on the display, receive, from the external server, address information of replacement content to be displayed in a replacement slot including a section between the content and next content displayed next to the content in response to the transmission of the information, increase a display time of one or more frames included in the replacement content when length of the replacement content is less than length of the replacement slot, and remove one or more frames included in the replacement content when the length of the replacement content is greater than the length of the replacement slot.

17 Claims, 10 Drawing Sheets

(51) Int. Cl.
*H04N 21/242* (2011.01)
*H04N 21/43* (2011.01)
*H04N 21/44* (2011.01)
*H04N 21/64* (2011.01)
*H04N 21/81* (2011.01)

(56) References Cited

U.S. PATENT DOCUMENTS

| | | |
|---|---|---|
| 8,068,440 B2 | 11/2011 | Stanwood et al. |
| 8,296,813 B2 | 10/2012 | Berkey et al. |
| 9,066,061 B2 | 6/2015 | Ryu et al. |
| 9,876,726 B2 | 1/2018 | Stanwood et al. |
| 2008/0060000 A1 | 3/2008 | Drouet et al. |
| 2010/0043022 A1 | 2/2010 | Kaftan |
| 2010/0205049 A1* | 8/2010 | Long ............ G06Q 30/02 705/14.5 |
| 2012/0151540 A1* | 6/2012 | Stanwood ........... H04L 65/00 725/109 |
| 2013/0067524 A1* | 3/2013 | Andrews ........ H04N 21/23436 725/109 |
| 2014/0074621 A1 | 3/2014 | Chai et al. |
| 2014/0096169 A1 | 4/2014 | Dodson et al. |
| 2014/0373081 A1 | 12/2014 | Dodson et al. |
| 2015/0156566 A1* | 6/2015 | Sansom ............ G06F 17/3082 725/59 |
| 2016/0065889 A1 | 3/2016 | Maurice |
| 2016/0117722 A1 | 4/2016 | Garcia |
| 2016/0323650 A1* | 11/2016 | Grouf ............ H04N 21/26283 |
| 2017/0287523 A1* | 10/2017 | Hodulik ................ G11B 27/10 |
| 2017/0325005 A1* | 11/2017 | Liassides ........ H04N 21/25841 |
| 2017/0347082 A1* | 11/2017 | Tseytlin ................ H04N 9/87 |

FOREIGN PATENT DOCUMENTS

| | | |
|---|---|---|
| JP | 5489675 | 5/2014 |
| KR | 10-0279850 | 2/2001 |
| KR | 10-2003-0020443 | 3/2003 |
| KR | 10-0725631 | 6/2007 |
| KR | 10-2013-0125779 | 11/2013 |
| KR | 10-2015-0053272 | 5/2015 |
| KR | 10-2015-0082184 | 7/2015 |

OTHER PUBLICATIONS

Office Action dated Dec. 27, 2017 in counterpart Korean Patent Application No. 10-2017-0030543.
Notice of Final Rejection dated Jun. 20, 2018 in counterpart Korean Patent Application No. 10-2017-0030543 and English-language translation thereof.
Extended Search Report dated Oct. 23, 2019 in counterpart European Patent Application No. 17869846.0.

* cited by examiner

ELECTRONIC APPARATUS AND OPERATING METHOD THEREOF

CROSS-REFERENCE TO RELATED APPLICATIONS

This application is based on and claims priority under 35 U.S.C. § 119 to U.S. Provisional Patent Application No. 62/419,579, filed on Nov. 9, 2016, in the U.S. Intellectual Property Office, Korean Patent Application No. 10-2016-0168010, filed on Dec. 9, 2016, in the Korean Intellectual Property Office, and Korean Patent Application No. 10-2017-0030543, filed on Mar. 10, 2017, in the Korean Intellectual Property Office, the disclosures of which are incorporated by reference herein in their entireties.

BACKGROUND

1. Field

The present disclosure relates generally to an electronic apparatus and an operating method thereof, and for example, to an electronic apparatus configured to display replacement content in a replacement slot between a piece of content and another piece of content and an operating method thereof.

2. Description of Related Art

Televisions (TVs) connected to smart TVs or the Internet are capable of receiving data from a data network, such as an Internet network, and thus, viewers may receive not only digital broadcasting content, but also multimedia content. Based on the use of TVs and various smart apparatuses connected to smart TVs or the Internet, content providers have been able to provide a variety of content, advertisements, and interactive content.

Such smart TVs having significantly improved data processing performance may enlarge and enrich user experience by providing content based on context. In order to provide the content based on context, the smart TVs or set-top boxes connected to the smart TVs may need to recognize in real time which content is displayed on a TV screen.

Accordingly, automatic content recognition, which is technology for recognizing content displayed on a TV, has been used, and the automatic content recognition mainly includes two technologies, which are digital watermarking and content fingerprinting. Digital watermarking is a method of transmitting a broadcasting signal by performing a pre-processing operation for burying watermark data in broadcasting content, and, via a TV, detecting the buried watermark and identifying the broadcasting content. Content fingerprinting is a method of extracting a fingerprint from content and matching the extracted fingerprint with a database to identify the content displayed on a TV via audio or video content fingerprinting. According to the content fingerprinting method, a TV continually extracts fingerprints from the content displayed on a TV display and transmits the extracted fingerprints to a fingerprint server operating a fingerprint database. The fingerprint server may match the fingerprints received from the TV with fingerprints stored in the fingerprint database, in order to identify the content displayed on the TV. Also, the fingerprint server may perform an operation of providing information with respect to the identified content to the TV.

Also, with an increase in customized advertisement services along with customized streaming services, methods for a server to provide a customized service for each client may include, for example, a method of determining a temporal section in which an advertisement is displayed between feature videos, as an advertisement (AD) slot or a replacement slot, and inserting an advertisement suitable for a user in the AD slot or the replacement slot. According to this method, it is only necessary to provide separate content, and thus, a particular technique is not required for a content provider. Also, it is a more efficient method for a service provider than a method of pre-encoding a feature video and an advertisement. When the advertisement content provided by the server is reproduced in the AD slot or the replacement slot, switching between reproducing the feature video and the reproducing the advertisement content may be smooth and compatible, only when a length of the advertisement content corresponds to the AD slot or the replacement slot.

SUMMARY

An electronic apparatus configured to achieve synchronization when reproducing replacement content in a replacement slot using automatic content recognition, and an operating method thereof are provided.

Additional aspects will be set forth in part in the description which follows and, in part, will be apparent from the description.

According to an aspect of an example embodiment, an electronic apparatus includes: a communication interface comprising communication circuitry; a display; a memory configured to store one or more instructions; and a processor configured to execute the one or more instructions stored in the memory, the instructions, when executed by the processor, cause the electronic apparatus to: transmit, to an external server, information for recognition of content displayed on the display, receive, from the external server, address information of replacement content to be displayed in a replacement slot indicating a section between the content and next content displayed next to the content, in response to the transmission of the information for recognition of the content to the external server, compare a length of the replacement slot in which the replacement content is to be displayed with a length of the replacement content obtained using the address information of the replacement content, increase a display time of one or more frames included in the replacement content so that the replacement content is displayed for a period of time corresponding to the length of the replacement slot when the length of the replacement content is less than the length of the replacement slot, and remove one or more frames included in the replacement content, when the length of the replacement content is greater than the length of the replacement slot.

The processor may be configured to execute the one or more instructions stored in the memory to cause the electronic apparatus to: remove a number of the one or more frames, the number corresponding to a difference between the length of the replacement content and the length of the replacement slot, when the length of the replacement content is greater than the length of the replacement slot.

The processor may be configured to execute the one or more instructions stored in the memory to cause the electronic apparatus to: select frames of B type and frames of P type from among frames of I type, frames of B type, and frames of P type, as the one or more frames to be removed.

The processor may be configured to execute the one or more instructions stored in the memory to cause the electronic device to: determine the number of one or more frames based on a predetermined interval, the number corresponding to the difference between the length of the replacement content and the length of the replacement slot, when the length of the replacement content is greater than the length of the replacement slot, analyze a predetermined number of frames neighboring the number of one or more frames determined based on the predetermined interval, and select frames of B type and frames of P type from among frames of I type, frames of B type, and frames of P type, as the one or more frames to be removed based on a result of the analysis.

The information for recognition of the content may include a fingerprint extracted from the content.

The length of the replacement slot may be received from the external server.

The processor may be configured to execute the one or more instructions stored in the memory to cause the electronic device to: further receive, from the external server, information on a time when the replacement content starts to be displayed, and start displaying the replacement content based on the received information.

The processor may be configured to execute the one or more instructions stored in the memory to cause the electronic device to: start displaying the replacement content downloaded, when receiving, from the external server, information related to displaying of the replacement content, while downloading the replacement content using the address information of the replacement content.

According to an aspect of another example embodiment, a method of operating an electronic apparatus includes: transmitting, to an external server, information for recognition of content displayed on the display, receiving, from the external server, address information of replacement content to be displayed in a replacement slot indicating a section between the content and next content displayed next to the content, in response to the transmission of the information for recognition of the content to the external server, comparing a length of the replacement slot in which the replacement content is to be displayed, with a length of the replacement content obtained using the address information of the replacement content, increasing a display time of one or more frames included in the replacement content so that the replacement content is displayed for a period of time corresponding to the length of the replacement slot when the length of the replacement content is less than the length of the replacement slot, and removing one or more frames included in the replacement content when the length of the replacement content is greater than the length of the replacement slot.

According to an aspect of another example embodiment, a non-transitory computer-readable recording medium has embodied thereon a program for executing the operating method of an electronic apparatus.

According to an aspect of another example embodiment, an electronic apparatus includes: a communication interface comprising communication circuitry; a display; a memory configured to store one or more instructions; and a processor configured to execute the one or more instructions stored in the memory, as the instructions, when executed by the processor, cause the electronic device to: identify a gap between a time point when displaying of first content ends and a time point when displaying of second content starts; decrease a frame rate of frames included in at least a portion of the first content such that the frames included in at least a portion of the first content continues to be displayed during the gap.

BRIEF DESCRIPTION OF THE DRAWINGS

These and/or other aspects, features and attendant advantages of the present disclosure will become apparent and more readily appreciated from the following detailed description, taken in conjunction with the accompanying drawings, in which like reference numerals refer to like elements, and wherein.

DETAILED DESCRIPTION

Figure 1:
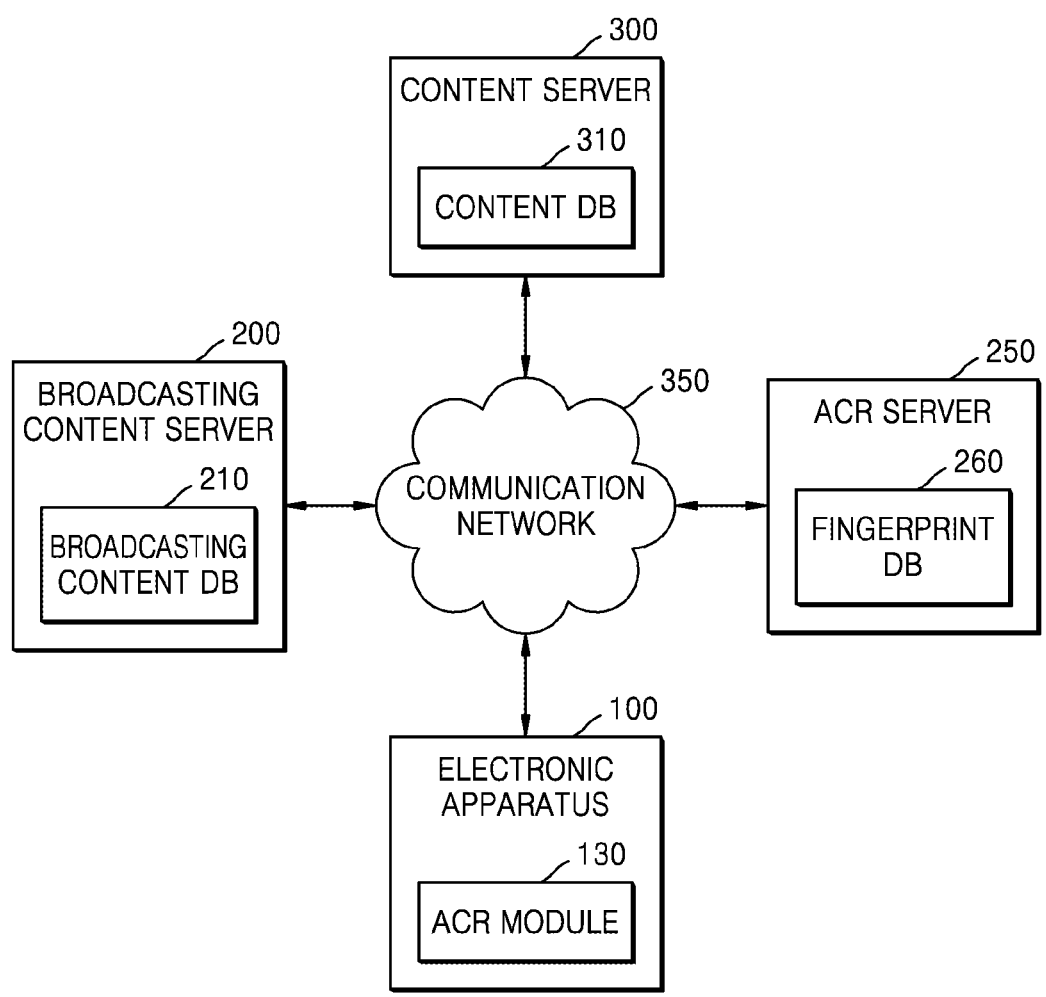
FIG. 1 is a diagram illustrating an example network system according to various example embodiments of the present disclosure.

Terms used in the present disclosure will be briefly described and the present disclosure will be described in greater detail with reference to the drawings.

The terms used in the present disclosure are selected from among common terms that are currently widely used in consideration of their function in the present disclosure. However, the terms may be different according to an intention of one of ordinary skill in the art, a precedent, or the advent of new technology. Also, in particular cases, the terms may be arbitrarily selected, and the meaning of those terms will be described in detail in the corresponding part of the detailed description. Therefore, the terms used in the present disclosure are not merely designations of the terms, but the terms are defined based on the meaning of the terms and content throughout the present disclosure.

Throughout the present disclosure, when a part "includes" an element, it is to be understood that the part additionally may include other elements rather than excluding other elements as long as there is no particular opposing recitation. Also, the terms such as " . . . unit," "module," or the like used in the present application indicate an unit, which processes at least one function or motion, and the unit may be implemented by hardware or software, or by a combination of hardware and software.

The present disclosure will now be described in greater detail with reference to the accompanying drawings for those of ordinary skill in the art to be able to appreciate the present disclosure without any difficulty. The disclosure may, however, be embodied in many different forms and should not be construed as being limited to the various example embodiments set forth herein. Also, parts in the drawings unrelated to the detailed description may be omitted to ensure clarity of the present disclosure. Like reference numerals in the drawings denote like elements, and thus their description will not be repeated.

The term "user" in the various example embodiments of the present disclosure may refer, for example, to a person controlling a function or an operation of an image display apparatus by using a controller, and may include a viewer, a manager, or an installation engineer.

As used herein, the term "and/or" includes any and all combinations of one or more of the associated listed items. Expressions such as "at least one of," when preceding a list of elements, modify the entire list of elements and do not modify the individual elements of the list.

FIG. 1 is a diagram illustrating an example network system according to various example embodiments.

Referring to FIG. 1, the network system may include an electronic apparatus 100, a broadcasting content server 200, an automatic content recognition (ACR) server 250, a content server 300, and a network 350.

The broadcasting content server 200 may provide broadcasting content stored in a broadcasting content database (DB) 210 to the electronic apparatus 100 through the network 350.

The content server 300 may provide content stored in a content DB 310 to the electronic apparatus 100 through the network 350.

A network provider, such as the broadcasting content server 200 or the content server 300, may include appropriate logics, circuits, interfaces, and/or codes configured to generate, obtain, or package content, such as a TV program or multimedia content, which is to be distributed to the electronic apparatus 100, such as an ACR-based device. Also, the network provider may provide content to the ACR server 250 to support an ACR operation.

The electronic apparatus 100 may receive broadcasting content from the broadcasting content server 200 and display the received broadcasting content, or may receive content from the content server 300 and display the received content.

The electronic apparatus 100 may include appropriate logics, circuits, interfaces, and/or codes configured to receive and provide content to a viewer. The electronic apparatus 100 may include an ACR module 130. The ACR module 130 may include appropriate logics, circuits, interfaces, and/or codes configured to provide an ACR function to the electronic apparatus 100.

The electronic apparatus 100 may extract a fingerprint by sampling content displayed on a screen at a certain rate, and transmit the extracted fingerprint to the ACR server 250 at a certain rate. For example, and without limitation, the ACR module 130 of the electronic apparatus 100 may extract a fingerprint by sampling the content displayed on the screen by 10 times per second, and transmit the extracted fingerprint to the ACR server 250 at a rate of transmitting, for example, 10 fingerprints per second.

The electronic apparatus 100 may be connected to a set-top box. The set-top box may include appropriate logics, circuits, interfaces, and/or codes configured to connect the electronic apparatus 100, such as an ACR-based device, to an external source, such as a content provider, and to convert a signal received from the external source into content to be displayed on the screen of the electronic apparatus 100.

The electronic apparatus 100 may include a display including the ACR module 130, a set-top connected to the display, and a pairing device pared to the display.

The ACR server 250 may include appropriate logics, circuits, interfaces, and/or codes configured to support the ACR operation of the electronic apparatus 100. The ACR server 250 may provide ACR applications and/or services to the electronic apparatus 100. The ACR server 250 may provide at least one ACR technique and may provide synchronization to the electronic apparatus 100. The ACR server 250 may support a plurality of different fingerprinting techniques for the ACR operation.

The ACR server 250 may include a fingerprint DB 260. When the ACR server 250 receives a fingerprint from the electronic apparatus 100, the ACR server 250 may analyze the received fingerprint based on the fingerprint DB 260, in order to obtain information about a replacement slot between the content displayed on the electronic apparatus 100 and next content, and transmit the information about the replacement slot to the electronic apparatus 100.

The ACR server 250 may match the fingerprint received from the electronic apparatus 100 with fingerprints stored in the fingerprint DB 260 in order to determine information corresponding to the content displayed on the electronic apparatus 100. The information corresponding to the content may include the information about the replacement slot between the content displayed on the electronic apparatus 100 and the next content to be displayed next to the content. The information about the replacement slot may include at least one of a start point of the replacement slot indicating a display point of the replacement content, a length of the replacement slot, and address information of the replacement content to be displayed in the replacement slot. The ACR server 250 may simultaneously or sequentially transmit the determined information about the replacement slot to the electronic apparatus 100.

The fingerprint DB 260 may include appropriate logics, circuits, interfaces, and/or codes configured to store a fingerprint obtained from a server providing the fingerprint and maintain relevance between the obtained fingerprint and content identification information/media time.

The communication network 350 may include appropriate logics, circuits, interfaces, and/or codes configured to enable communication among a plurality of entities based on various wired or wireless technologies. The wired or wireless technologies may include T1/E1, DSL, cable modem, FTTx, PLC, and/or WiMax. The communication network 350 may include the Internet or a multimedia network.

The electronic apparatus 100 according to an embodiment may, for example, and without limitation, be a television (TV). However, this is only an embodiment, and the electronic apparatus 100 may be implemented as electronic apparatuses including a display. For example, the electronic apparatus 100 may be implemented as various electronic apparatuses, such as cellular phones, tablet personal computers (PCs), digital cameras, camcorders, laptop computers, desktop computers, electronic book terminals, digital broadcasting terminals, personal digital assistants (PDAs), portable multimedia players (PMPs), navigation devices, MP3 players, wearable devices, or the like, but is not limited thereto.

The electronic apparatus 100 may be controlled by a controller, and the controller may include various processing circuitry and/or types of devices configured to control the electronic apparatus 100, such as a remote controller or a cellular phone, or the like, but is not limited thereto. Also, the controller may control the electronic apparatus 100 via short-range communication including infrared or Bluetooth communication, or the like, but is not limited thereto.

Figure 2:
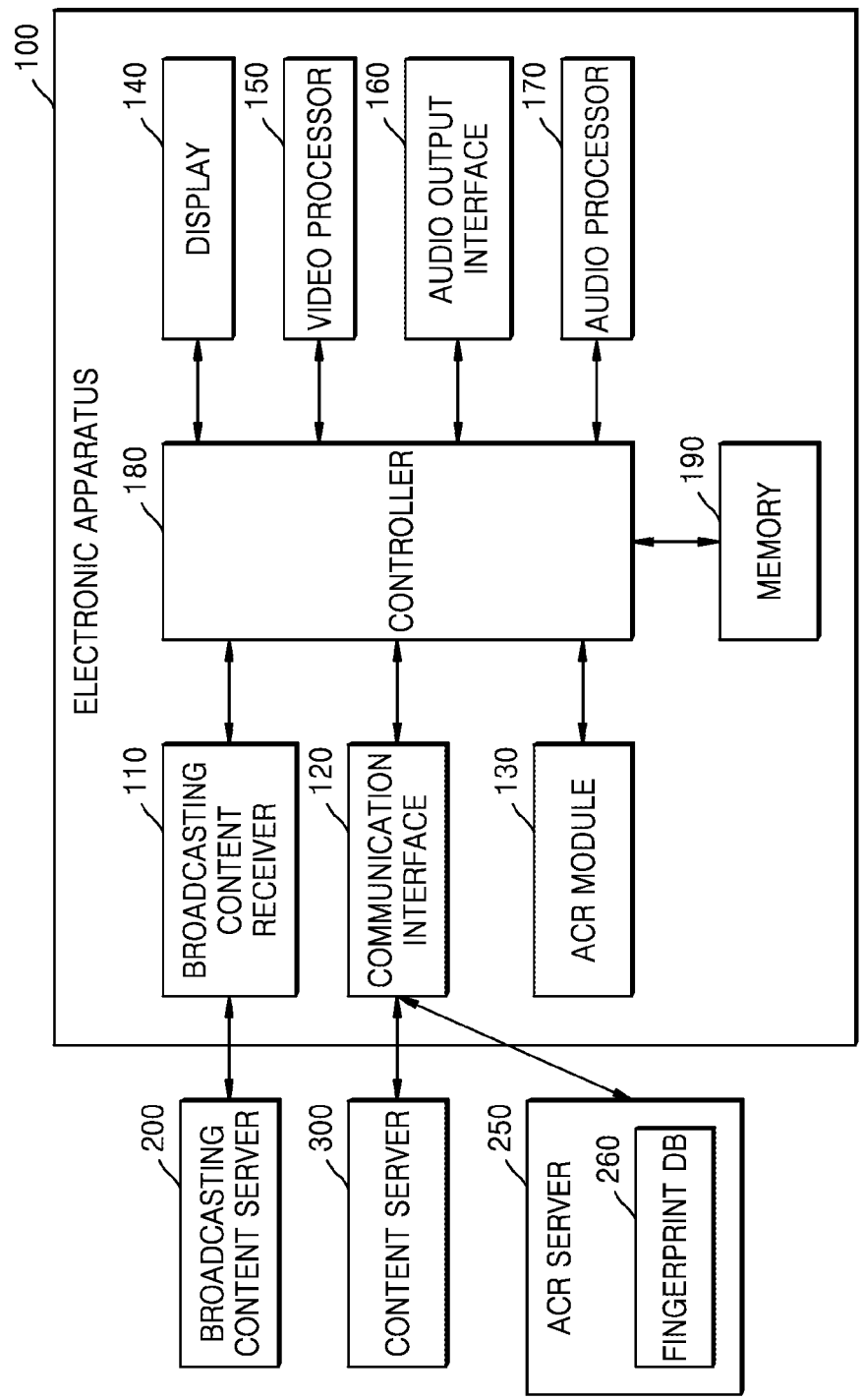
FIG. 2 is a block diagram illustrating an example electronic apparatus according to an example embodiment.

FIG. 2 is a block diagram illustrating the electronic apparatus 100 according to an example embodiment.

Referring to FIG. 2, the electronic apparatus 100 may include a broadcasting content receiver 110, a communication interface (e.g., including communication circuitry) 120, the ACR module (e.g., including ACR circuitry) 130, a display 140, a video processor (e.g., including video processing circuitry) 150, an audio output unit (e.g., including audio output circuitry) 160, an audio processor (e.g., including audio processing circuitry) 170, a controller (e.g., including processing circuitry)_180 and a memory 190.

The broadcasting content receiver 110 may include various circuitry and receive broadcasting content from the broadcasting content server 200.

The broadcasting content receiver 110 may include, for example, and without limitation, a tuner. The tuner may perform a signal-processing operation based on amplification, mixing, resonance, etc. of broadcasting signals received in wires or wirelessly, and may tune and select only a frequency of a channel, which is to be received by the electronic apparatus 100, from among electronic wave elements of the plurality of received broadcasting signals. The broadcasting signals may include an audio, a video, and additional information (for example, an electronic program guide (EPG)). The tuner may receive broadcasting signals from various sources, such as ground-wave broadcasting, cable broadcasting, satellite broadcasting, Internet broadcasting, etc. The tuner may receive broadcasting signals from a source, such as analog broadcasting or digital broadcasting.

The communication interface 120 may include various communication circuitry and receive multimedia content from the content server 300. Also, the communication interface 120 may perform communication with the ACR server 250.

According to an embodiment, the communication interface 120 may periodically transmit content recognition information used for recognition of content displayed on the display 140, for example, a fingerprint corresponding to the content, to the ACR server 250, under control of the ACR module 130.

According to an embodiment, the communication interface 120 may periodically receive information about a replacement slot from the ACR server 250 and may provide the received information about the replacement slot to the ACR module 130. The information about the replacement slot may include at least one of a start point of the replacement slot indicating a display point of replacement content, a length of the replacement slot, and address information of the replacement content to be displayed in the replacement slot.

The ACR module 130 may include various ACR circuitry, such as, for example, and without limitation, appropriate logics, circuits, interfaces, and/or codes configured to provide an ACR function to the electronic apparatus 100. The ACR module 130 may communicate with the ACR server 250 via the communication network 350 to support an ACR operation of the electronic apparatus 100.

The ACR module 130 may periodically provide a fingerprint to the ACR server 250 for recognition of the content displayed on the display 140. The ACR module 130 may receive ACR-related information or content from the ACR server 250. The ACR module 130 may execute a synchronization event manager configured to monitor events occurring inside or outside the electronic apparatus 100. The synchronization event manager may be executed as a background process so as to be continually executed during the monitoring operation. The events occurring outside the electronic apparatus 100 may include, for example, an event corresponding to ACR matching. The events occurring inside the electronic apparatus 100 may include a process, an application, and/or a function corresponding to the ACR performed by the electronic apparatus 100. In response to a detection of an event trigger, the synchronization event manager may request or receive an appropriate application. The synchronization event manager may be implemented as hardware, software, firmware, or the like.

The ACR module 130 may identify viewer information or viewer interaction related to the electronic apparatus 100 via the ACR server 250, and based on the identified viewer information or viewer interaction, the ACR server 250 may provide diversified advertisements to be displayed in the replacement slot. The replacement slot indicates a temporal section between content displayed on the display 140 and next content to be displayed next to the content, and refers to a section in which replacement content may be displayed. The replacement slot may include an AD pot or a commercial break during a display of content. The replacement content which may be displayed in the replacement slot is not limited to a particular type, and may include any type of content. For example, the replacement content may include advertisement content.

According to an embodiment, the ACR module 130 may monitor the content displayed on the display 140, periodically obtain a fingerprint from the displayed content, and transmit the obtained fingerprint to the ACR server 250.

According to an embodiment, the ACR module 130 may receive the information about the replacement slot from the ACR server 250. The information about the replacement slot may include the at least one of the start point of the replacement slot indicating the display point of the replacement content, the length of the replacement slot, and the address information of the replacement content to be displayed in the replacement slot.

According to an embodiment, the ACR module 130 may access the replacement content by using the address information of the replacement content, in order to receive the replacement content before the start point of the replacement slot. The address information of the replacement content may include, for example, a uniform resource locater (URL) of the replacement content.

According to an embodiment, the ACR module 130 may receive information about a display point of the replacement content from the ACR server 250, and based on the received information about the display point of the replacement content, may start displaying the replacement content.

According to an embodiment, the ACR module 130 may start displaying the replacement content downloaded, when the ACR module 130 receives information about displaying of the replacement content from the ACR server 250, while downloading the replacement content by using the address information of the replacement content.

According to an embodiment, the ACR module 130 may control the video processor 150 such that the video processor 150 processes the replacement content in correspondence to the length of the replacement slot. For example, the ACR module 130 may control the video processor 150 such that the video processor 150 compares a length of the received replacement content with the length of the replacement slot, and when the length of the replacement content is less than the length of the replacement slot, the video processor 150 increases displaying of one or more frames of the replacement content, and when the length of the replacement content is greater than the length of the replacement slot, the video processor 150 controls one or more frames of the replacement content.

The display 140 may convert an image signal, a data signal, an on screen display (OSD) signal, a control signal, etc. processed by the video processor 150, in order to generate a driving signal. The display 140 may be implemented as a plasma display panel (PDP), a liquid crystal display (LCD), an organic light-emitting display (OLED), a flexible display, or the like, but is not limited thereto, and may also be implemented as a three-dimensional (3D) display. Also, the display 140 may include a touch screen so as to be used not only as an input device, but also as an output device.

The video processor 150 may include various video processing circuitry and perform signal processing on an image to be displayed on the display 140, and may perform various image processing on video data, such as decoding, scaling, noise filtering, frame rate conversion, resolution conversion, or the like, but is not limited thereto.

According to an embodiment, when a length of a video of the replacement content to be displayed in the replacement slot next to the content displayed on the display 140, is less than the length of the replacement slot, the video processor 150 may maintain displaying of one or more video frames included in the replacement content, and when the length of the video of the replacement content to be displayed in the replacement slot next to the content displayed on the display 140 is greater than the length of the replacement slot, the video processor 150 may remove one or more video frames included in the replacement content, under control of the ACR module 130. The operation of the video processor 150 will be described in detail with reference to FIG. 3.

The audio output interface 160 may include various audio output circuitry and output an audio signal processed by the audio processor 170.

The audio output interface 160 may include, for example, and without limitation, at least one or a combination of a speaker, a headphone output terminal, and a Sony/Philips digital interface (S/PDIF) output terminal.

The audio processor 170 may include various audio processing circuitry and process the audio signal to be output by the audio output interface 160.

The audio processor 170 may process audio data. The audio processor 170 may perform various processing on the audio data, such as decoding, amplification, noise filtering, or the like, but is not limited thereto. Meanwhile, the audio processor 170 may include a plurality of audio processing modules for processing audios corresponding to a plurality of pieces of content.

According to an embodiment, when a length of an audio of the replacement content to be displayed in a next replacement slot is less than a length of the replacement slot, the audio processor 170 may maintain displaying of one or more audio frames included in the replacement content, and when the length of the audio of the replacement content is greater than the length of the replacement slot, the audio processor 170 may remove one or more audio frames included in the replacement content, under control of the ACR module 130.

The controller 180 may include various processing circuitry and control general operations of the electronic apparatus 100 and signal flows among internal components of the electronic apparatus 100, and may process data. When there is a user's input or when a stored predetermined condition is met, the controller 180 may execute an operation system (OS) and various applications stored in the memory 190.

The controller 180 may include random-access memory (RAM), in which a signal or data input from the outside of the electronic apparatus 100 is stored, or which is used as a storage area corresponding to various operations performed by the electronic apparatus 100, read-only memory (ROM), in which a control program for controlling the electronic apparatus 100 is stored, and a processor.

It is described that the ACR-related operations are performed by the ACR module 130. However, all or part of operations or functions of the ACR module 130 may be performed by the controller 180.

The memory 190 may include an operating system, data processed by the controller 180, and one or more instructions executed by the controller 180.

In particular, the memory 190 according to an embodiment may include one or more instructions executed by the ACR module 130.

According to an embodiment, the term "memory" may refer, for example, to a storage, ROM or RAM of the controller 180, or a memory card (for example, a micro SD card, universal serial bus (USB) memory, etc. (not shown)) mounted in the electronic apparatus 100. Also, the memory 190 may include a non-volatile memory, a volatile memory, a hard disk drive (HDD), or a solid state drive (SSD).

In addition to the components illustrated in FIG. 2, the electronic apparatus 100 may further include an input/output unit configured to receive a video, an audio, and additional information from the outside of the electronic apparatus 100, and a sensor configured to sense an image of a user and an interaction of the user.

Also, the electronic apparatus 100 is not limited to the term thereof, and may include any electronic apparatus including a processor and a memory to execute an application, such as laptop computers, smart phones, tablet PCs, wearable devices, PDAs, or the like, but is not limited thereto.

Meanwhile, the block diagram of the electronic apparatus 100 illustrated in FIG. 2 is merely an example embodiment. The components of the block diagram of FIG. 2 may be combined, added, or omitted according to the specification of the electronic apparatus 100 actually implemented. That is, two or more components may be combined into one component, or one component may be divided into two or more components, according to necessity. Also, a function performed by each block is for describing embodiments, and its specific operation or apparatus does not limit the scope of the present disclosure.

Figure 3:
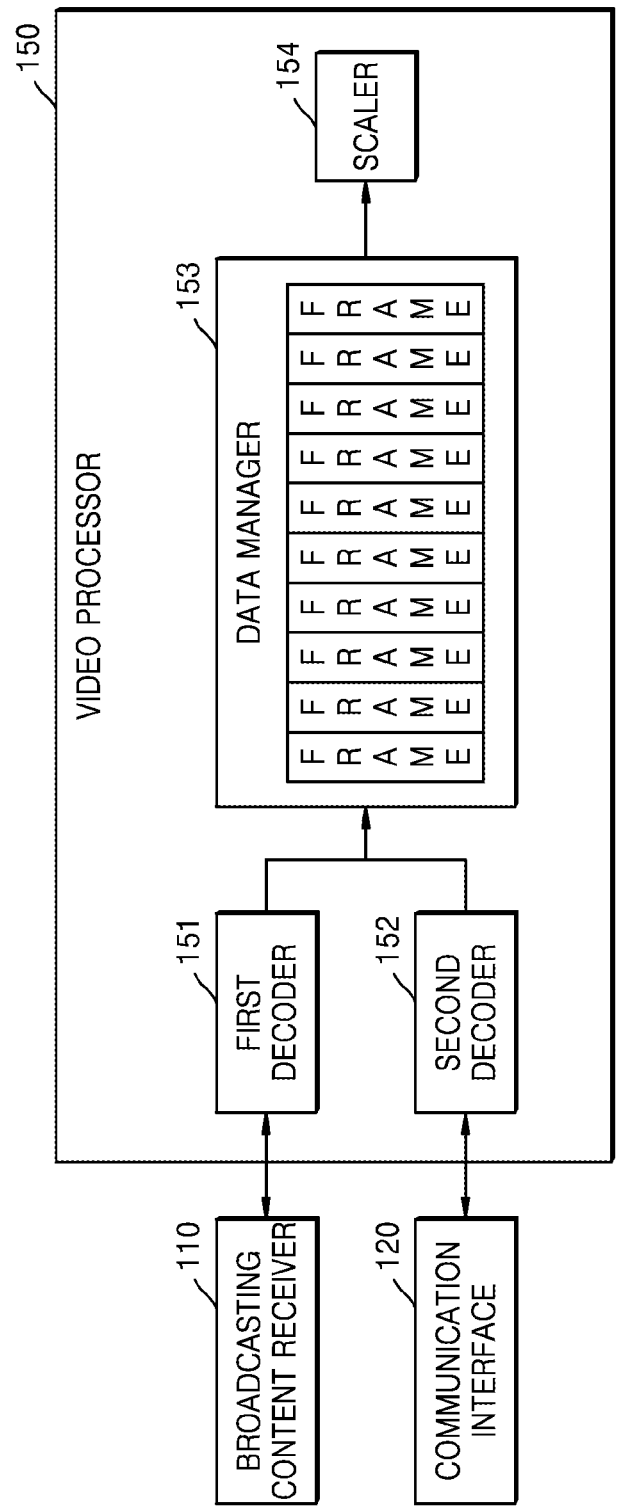
FIG. 3 is a diagram illustrating an example structure of a video processor illustrated in FIG. 2.

FIG. 3 is a diagram illustrating an example structure of the video processor 150 illustrated in FIG. 2.

Referring to FIG. 3, the video processor 150 may include a first decoder 151, a second decoder 152, a data manager (e.g., including data managing circuitry) 153, and a scaler (e.g., including scaling circuitry) 154.

The first decoder 151 may decode broadcasting content data received from the broadcasting content receiver 110 and transmit the decoded data to the data manager 153.

The second decoder 152 may decode multimedia content data received from the communication interface 120 and transmit the decoded data to the data manager 153.

The data manager 153 may receive the decoded data in a frame unit from at least one of the first decoder 151 and the second decoder 152, and may transmit the decoded data to the scaler 154 to have the received frames rendered.

According to an embodiment, when a length of the replacement content received from the second decoder 152 is less than a length of the replacement slot, the data manager 153 may increase a display time of at least one frame of frames included in the replacement content, in correspondence to a time corresponding to a <difference between the length of the replacement content and the length of the replacement slot>, under control of the ACR module 130. For example, the data manager 153 may increase the display time of a last frame of the frames included in the replacement content, in correspondence to the time corresponding to the difference between the length of the replacement content and the length of the replacement slot.

According to an embodiment, when the length of replacement content received from the second decoder 152 is greater than the length of a replacement slot, the data manager 153 may remove at least one frame of the frames included in the replacement content, in correspondence to a time corresponding to the difference between the length of the replacement content and the length of the replacement slot, under control of the ACR module 130. For example, the data manager 153 may periodically remove the frames included in the replacement content, in correspondence to the time corresponding to the difference between the length of the replacement content and the length of the replacement slot.

The method of controlling the frames based on the comparison between the length of the replacement content and the length of the replacement slot will be described in greater detail below with reference to FIGS. 5 through 7.

According to an embodiment, when first content is converted into second content for displaying, the data manager 153 may display frames included in at least a portion of the first content until a start point of the second content by reducing a frame rate with respect to the frames included in at least a portion of the first content, under control of the ACR module 130.

Figure 4:
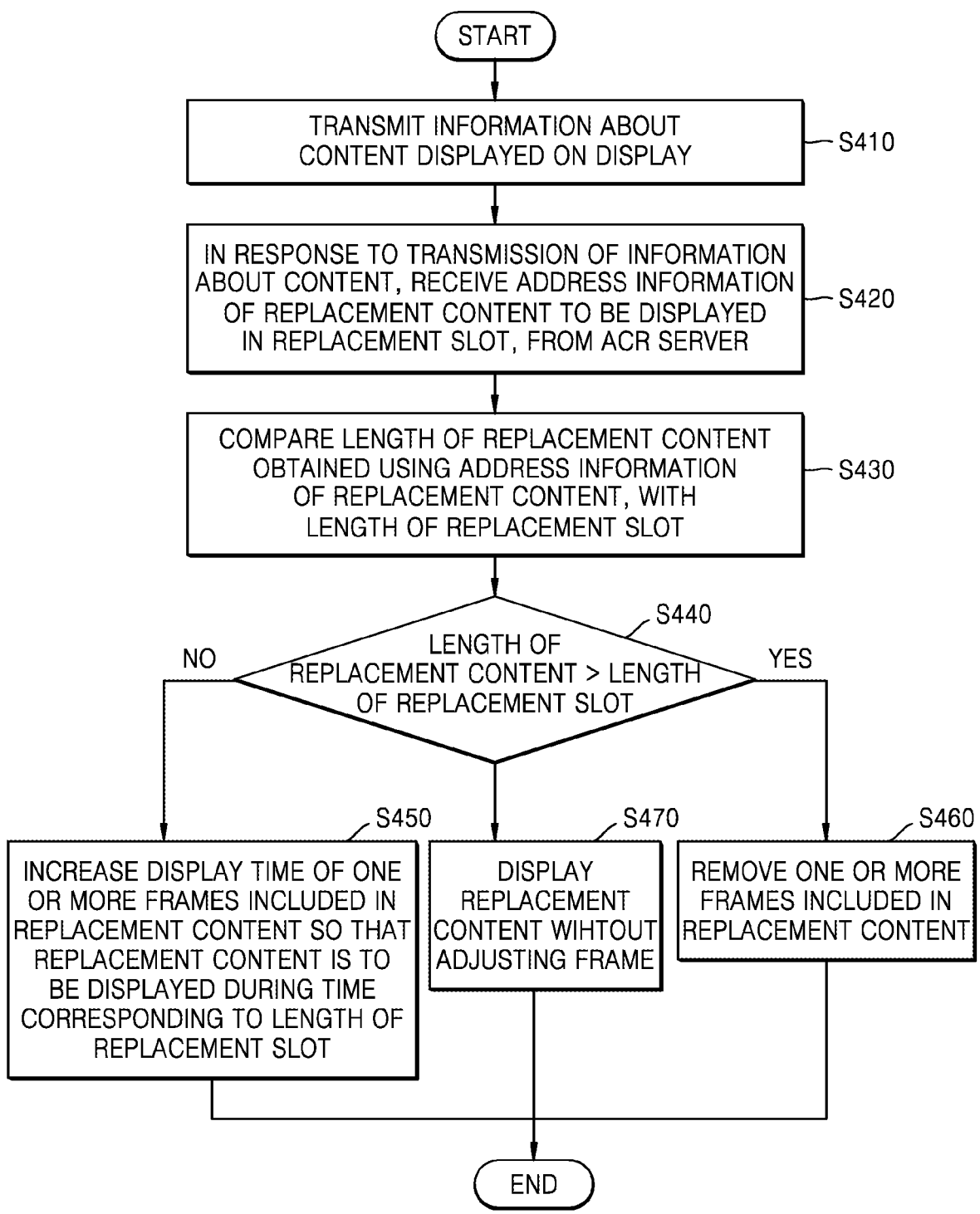
FIG. 4 is a flowchart illustrating an example operation of an electronic apparatus, according to an example embodiment.

FIG. 4 is a flowchart illustrating an example operation of the electronic apparatus 100, according to an example embodiment.

Referring to FIG. 4, in operation S410, the electronic apparatus 100 may transmit information about content displayed on a display, for example, to be used for recognition of content displayed on the display 140 to the ACR server 250.

For example, the ACR module 130 of the electronic apparatus 100 may periodically transmit a fingerprint obtained using the content displayed on the display 140 to the ACR server 250.

In operation S420, the electronic apparatus 100 may receive address information of replacement content to be displayed in the replacement slot from the ACR server 250.

The electronic apparatus 100 may further receive a start point and a length of the replacement slot, as information with respect to the replacement slot.

The ACR module 130 of the electronic apparatus 100 may periodically receive the address information of the replacement content to be displayed in the replacement slot, from the ACR server 250. The ACR module 130 may further receive a start point and a length of the replacement slot, as information with respect to the replacement slot.

In operation S430, the electronic apparatus 100 may compare a length of the replacement content obtained using the address information of the replacement content with the length of the replacement slot.

For example, the ACR module 130 of the electronic apparatus 100 may monitor the start point of the replacement slot and when the start point or a display point of the replacement slot approaches, the ACR module 130 may access the content server 300 and receive the replacement content by using the address information of the replacement content.

Further, the ACR module 130 may start displaying the replacement content based on information about a display point of the replacement content.

Further, the ACR module 130 may start displaying the replacement content that is downloaded, when the ACR module 130 receives the information about the display point of the replacement content from the ACR server 250, while downloading the replacement content by using the address information of the replacement content.

The ACR module 130 may compare the length of the replacement slot with the length of the received replacement content. The length of the replacement content may be obtained from the replacement content by parsing the received replacement content.

When the electronic apparatus 100 determines that the length of the replacement content is less than the length of the replacement slot in operation S440, operations may proceed to operation S450.

In operation S450, the electronic apparatus 100 may increase a display time of at least one frame included in the replacement content so that the replacement content may be displayed during a time corresponding to the length of the replacement slot.

For example, the ACR module 130 of the electronic apparatus 100 may control the video processor 150 to increase the display time of the at least one frame included in the replacement content.

When the electronic apparatus 100 determines that the length of the replacement content is greater than the length of the replacement slot in operation S440, operations may proceed to operation S460.

In operation S460, the electronic apparatus 100 may remove at least one frame included in the replacement content.

For example, the ACR module 130 of the electronic apparatus 100 may control the video processor 150 to remove the at least one frame included in the replacement content.

When the electronic apparatus 100 determines that the length of the replacement content is the same as the length of the replacement slot in operation S440, operations may proceed to operation S470 to display the replacement content in the replacement slot without removing frames of the replacement content or increasing display times of the frames.

Figure 5:
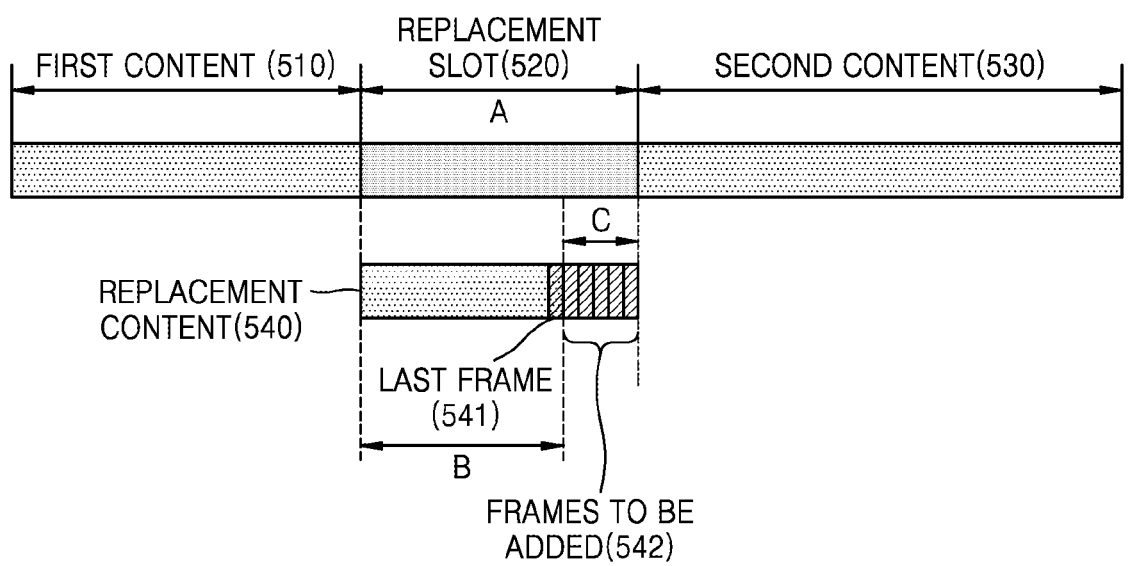
FIG. 5 is a diagram illustrating an example method of adjusting a length of replacement content in correspondence to a length of a replacement slot, when the length of the replacement content is less than the length of the replacement slot, according to an example embodiment.

FIG. 5 is a diagram illustrating an example method of adjusting a length of replacement content 540 in correspondence to a length of a replacement slot 520, when the length of the replacement content 540 is less than the length of the replacement slot 520, according to an example embodiment.

Referring to FIG. 5, the replacement slot 520 may be arranged between first content 510 and second content 530. For example, the first content 510 and the second content 530 may be included in a program, and the replacement slot 520 may be a section for an advertisement inserted in the middle of the program. For example, the first content 510 and the second content 530 may be different programs, and the replacement slot 520 may be a section for an advertisement inserted during a break between the program of the first content 510 and the other program of the second content 530. At least one piece of replacement content 540 may be displayed in the replacement slot 520.

When the length of the replacement content 540 is less than the length of the replacement slot 520, there may be a time left before the second content 530 is displayed on the display 140 of the electronic apparatus 100 after the replacement content 540 is displayed on the display 140 of the electronic apparatus 100. For example, when it is assumed that the length of the replacement slot 520 is A, the length of the replacement content 540 is B, and a difference B-A between the length of the replacement content 540 and the length of the replacement slot 520 is C, the display 140 of the electronic apparatus 100 may, during a time corresponding to the difference C, display nothing, after displaying the replacement content 540. In order to prevent the display 140 from displaying nothing as described above since the replacement content is short, the electronic apparatus 100 may maintain displaying of one or more frames of the replacement content 540 during the time corresponding to the difference C, to display content on the display 140.

For example, when it is assumed that a frame rate is F, the number of frames to be displayed during the time corresponding to the difference C may be C*F. For example, the electronic apparatus 100 may determine at least one frame of the replacement content 540 as a frame to be displayed during the time corresponding to the difference C. For example, the electronic apparatus 100 may determine a last frame 541 of the replacement content 540 as the frame to be displayed during the time corresponding to the difference C. The last frame 541 of the replacement content 540 may be used as frames 542 which are added to the replacement content 540 during the time C. The data manager 153 of FIG. 3 may continually transmit the last frame 541 of the replacement content 540 to the scaler 154 during the time corresponding to the difference C, so that the last frame 541 may be displayed during the time corresponding to the difference C. However, to use the last frame 541 of the replacement content 540 is only an example, and the electronic apparatus 100 may use one or more frames of the replacement content 540 during the time corresponding to the difference C.

Figure 6:
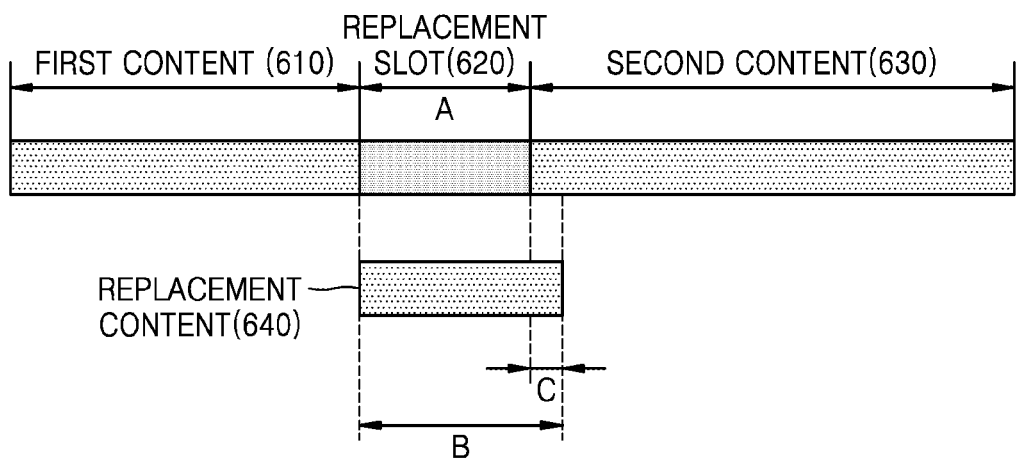
FIG. 6 is a diagram illustrating an example method of adjusting a length of replacement content in correspondence to a length of a replacement slot, when the length of the replacement content is greater than the length of the replacement slot, according to an example embodiment.

FIG. 6 is a diagram illustrating an example method of adjusting a length of replacement content 640 in correspondence to a length of a replacement slot 620, when the length of the replacement content 640 is greater than the length of the replacement slot 620, according to an example embodiment.

Referring to FIG. 6, the replacement slot 620 may be arranged between first content 610 and second content 630. Unlike the example of FIG. 5, in an example of FIG. 6, the length of the replacement content 640 is greater than the length of the replacement slot 620. In this case, unlike the case of FIG. 5, when displaying the replacement content 640 in the replacement slot 620, the replacement slot 620 is ended before the replacement content 640 is completely displayed. Thus, a portion of the replacement content 640, the portion corresponding to the time corresponding to the difference C, may not be displayed. For example, when the replacement content 640 includes an advertisement of 60 seconds, about 50 seconds of the advertisement may be displayed in the replacement slot 620, and the displaying of the replacement content 640 may be stopped so that the rest portion of the replacement content 640 may not be displayed, and the second content 630 may start to be displayed. In this case, since the advertisement displayed in the replacement slot 620 is stopped in the middle and the next content 630 starts to be displayed, a viewer may have an inconvenient and odd experience.

Thus, the electronic apparatus 100 may need to appropriately adjust frames of the replacement content 640 having a greater length than the replacement slot 620, in correspondence to the replacement slot 620, and appropriately select the frames of the replacement content 640. For example, in the example illustrated in FIG. 6, the number of frames of the replacement content 640 that have to be removed in order to adjust the replacement content 640 to correspond to the length of the replacement slot 620 may be C*F, and a frame removal cycle may be B/C. The frame removal cycle may indicate with respect to how many frames a frame has to be removed. When any one section is completely removed in order to make a long video short, there is a high possibility that a main feature of the content may be lost, and thus, it may be desirable to evenly remove frames included in the total video based on a predetermined cycle.

Figure 7:
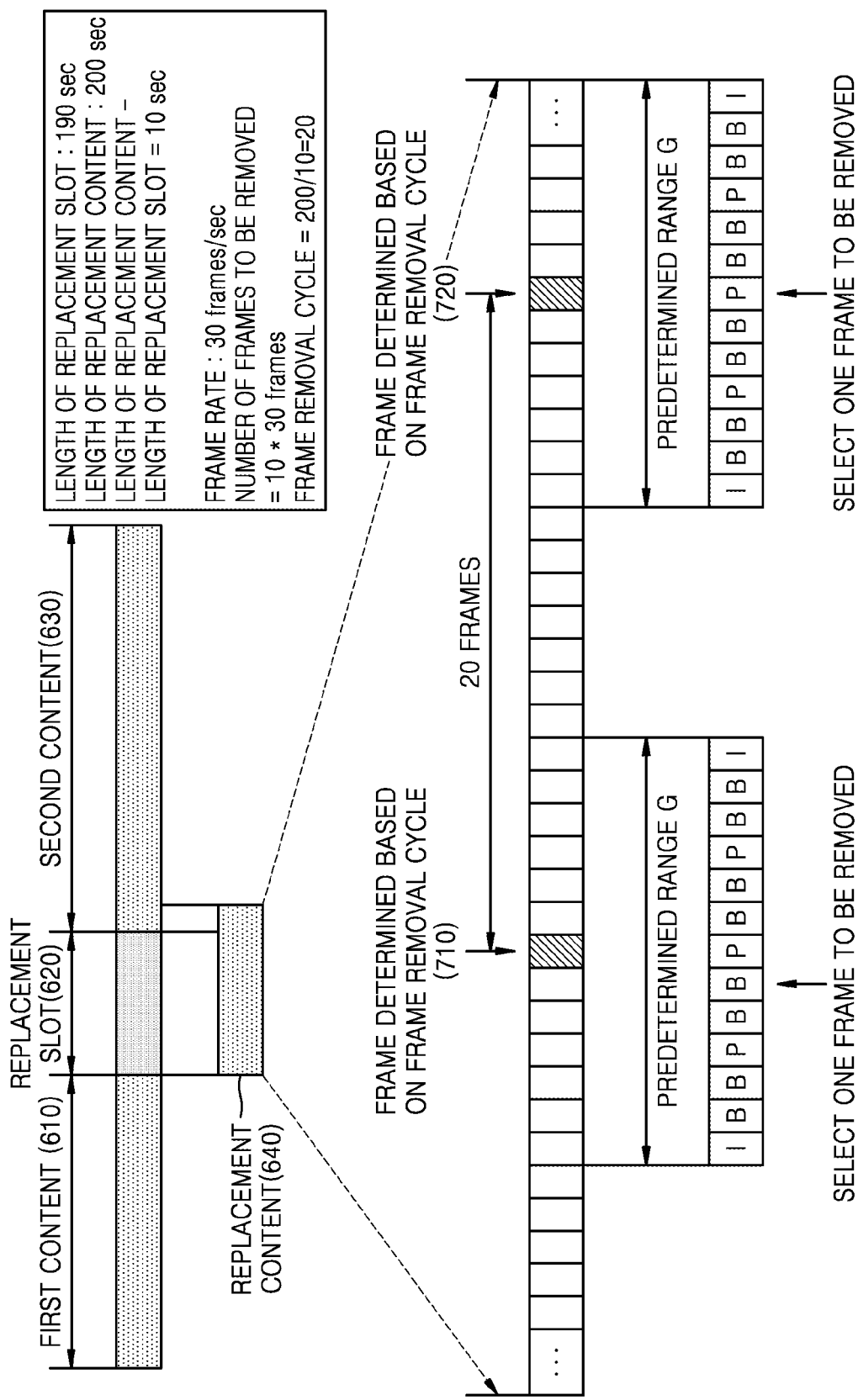
FIG. 7 is a diagram illustrating an example method of selecting a frame to be removed from replacement content, when a length of the replacement content is greater than a length of a replacement slot according to an example embodiment.

FIG. 7 is a diagram illustrating an example method of selecting frames to be removed from the replacement content 640, when a length of the replacement content 640 is greater than a length of the replacement slot 620, according to an embodiment.

In FIG. 7, a method of more effectively selecting one or more frames to be removed when the frames are removed based on a frame removal cycle, in the case illustrated in FIG. 6, will be described.

For example, when the length of the replacement slot 620 is 190 seconds and the length of the replacement content 640 is 200 seconds, a difference between the length of the replacement content 640 and the length of the replacement slot 620 is 10 seconds. It may indicate that frames of about 10 seconds have to be removed from the replacement content 640 in order to make the replacement content 640 correspond to the length of the replacement slot 620. When a frame rate is 30 frames/sec, the number of frames to be removed from the replacement content 640 may be 10*30 frames. Also, the frame removal cycle may be calculated as 200/10=20. That is, in order to make the length 200 seconds of the replacement content 640 correspond to the length 190 seconds of the replacement slot 620, the number of frames to be removed from the replacement content 640 may be 10*30 frames, and in order to periodically and evenly remove the frames from the total section of the replacement content 640, the frame removal cycle may be 20, which indicates that one frame in every 20 frame may be removed.

Also, when removing the frames based on the frame removal cycle, a frame containing important information may not be removed, and a frame containing less important information may be removed. For example, when the frames are removed based on a predetermined interval, an image may not be smoothly displayed, when a frame removed is at a point of conversion of a scene, and thus, it may be necessary to remove the frames generating the least difference from the other frames in the image. To this end, the electronic apparatus 100 may predetermine a range G based on frames determined based on the frame removal cycle, and may determine one of frames within the predetermined range G, as the frame to be removed. Here, the electronic apparatus 100 may select, as the frame to be removed, a frame from among the frames within the predetermined range G, which has less important information than the other frames, that is, a frame not corresponding to an independent scene but referring to pre/post frames.

A group of pictures (GOP) is a basic option of MPEG-1/2 encoding and denotes a set of frames from a key frame to a next key frame. The GOP includes types of frames I, B, P, etc., and in a video codec, one of the three modes, I, B, and P may be used to encode each frame. The frame I is an abbreviation of an intra frame and denotes a key frame. The frame I is a frame having the best image quality and is separately encoded without reference to another frame. The frame P is an abbreviation of a predicted frame, and is a frame formed with reference to information of a previous key frame and has intermediate image quality and capacity. The frame B is an abbreviation of a bidirectional frame, and is a frame formed with reference to information of the previous and next frames I and P and has the worst image quality and the least capacity.

As shown above, frames included in the replacement content include frames having different characteristics. Thus, the electronic apparatus 100 may select the frame having less important information from among the frames included in the predetermined range G, as the frame to be removed, wherein the predetermined range G is determined based on the frames determined based on the frame removal cycle. That is, the electronic apparatus 100 may select the frame B or P which has to refer to another frame, as the frame to be removed.

For example, referring to FIG. 7, the electronic apparatus 100 may remove one frame within the predetermined range G determined based on a frame 710 determined based on the frame removal cycle, and may remove one frame, which occurs after 20 frames, within the predetermined range G determined based on a next determined frame 720. Also, the electronic apparatus 100 may determine, as the frame to be removed, the frame B or P having less important information, from among the frames I, B, and P included in the predetermined range G.

The video frames of the replacement content 540 and 640 are described with reference to FIGS. 5 through 7. However, the aspects with respect to the video frames may be applied to the audio frames in the same way.

Meanwhile, when a separate feature video and advertisement content are sequentially displayed, a blank section may occur, in a process in which the previous feature video is ended and the display of the next advertisement video is prepared, due to preparation and data processing time. Thus, since screen breaks occur during the blank section, a smooth display service may not be provided to a user. That is, in a format whereby a resource dismissed from previous content is connected to and displayed as next content, a black screen section may occur, in which nothing is shown on a screen during a time in which the resource is dismissed/connected, and image breaks may become apparent, thereby providing the user a bad experience. Thus, it is necessary to provide a convenient user experience, by minimizing and/or reducing sections in which the image is broken due to conversion of content.

For example, referring to FIG. 3, the first decoder 151 may decode the broadcasting content received by the video processor 150 from the broadcasting content receiver 110, and the scaler 154 may scale the decoded broadcasting content through the data manager 153, in order to display the broadcasting content. Here, when the broadcasting content is converted to advertisement content via the communication interface 120, a point in time in which the display of the broadcasting content from the first decoder 151 is completed and a point in time in which the display of the advertisement content from the second decoder 152 is started may not precisely correspond to each other and a delay may occur, due to a physical hardware switching time and a software processing time. In order to minimize the delay, a data rendering speed may be adjusted by adjusting a frame rate of the broadcasting content accumulated in the data manager 153, while the processing of the advertisement content is prepared.

Figure 8:
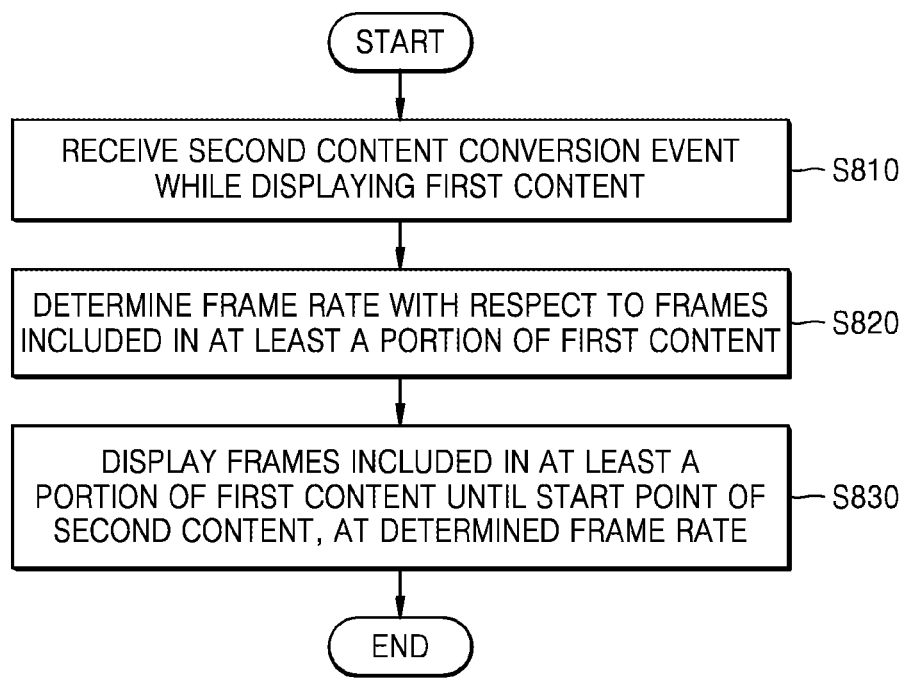
FIG. 8 is a flowchart illustrating an example process of conversion from first content to second content, according to an example embodiment.

FIG. 8 is a flowchart illustrating an example process of conversion from first content to second content, according to an example embodiment.

Referring to FIG. 8, in operation S810, the electronic apparatus 100 may receive a second content conversion event while displaying the first content.

In operation S820, the electronic apparatus 100 may determine a frame rate with respect to frames included in at least a portion of the first content. That is, the electronic apparatus 100 may determine an adjusted frame rate, which is different from an initial frame rate of the first content, with respect to at least a portion of the first content, in order to make smooth the conversion of content.

In operation S830, the electronic apparatus 100 may display the frames included in at least a portion of the first content until a start point of the second content, at the determined frame rate.

Figure 9:
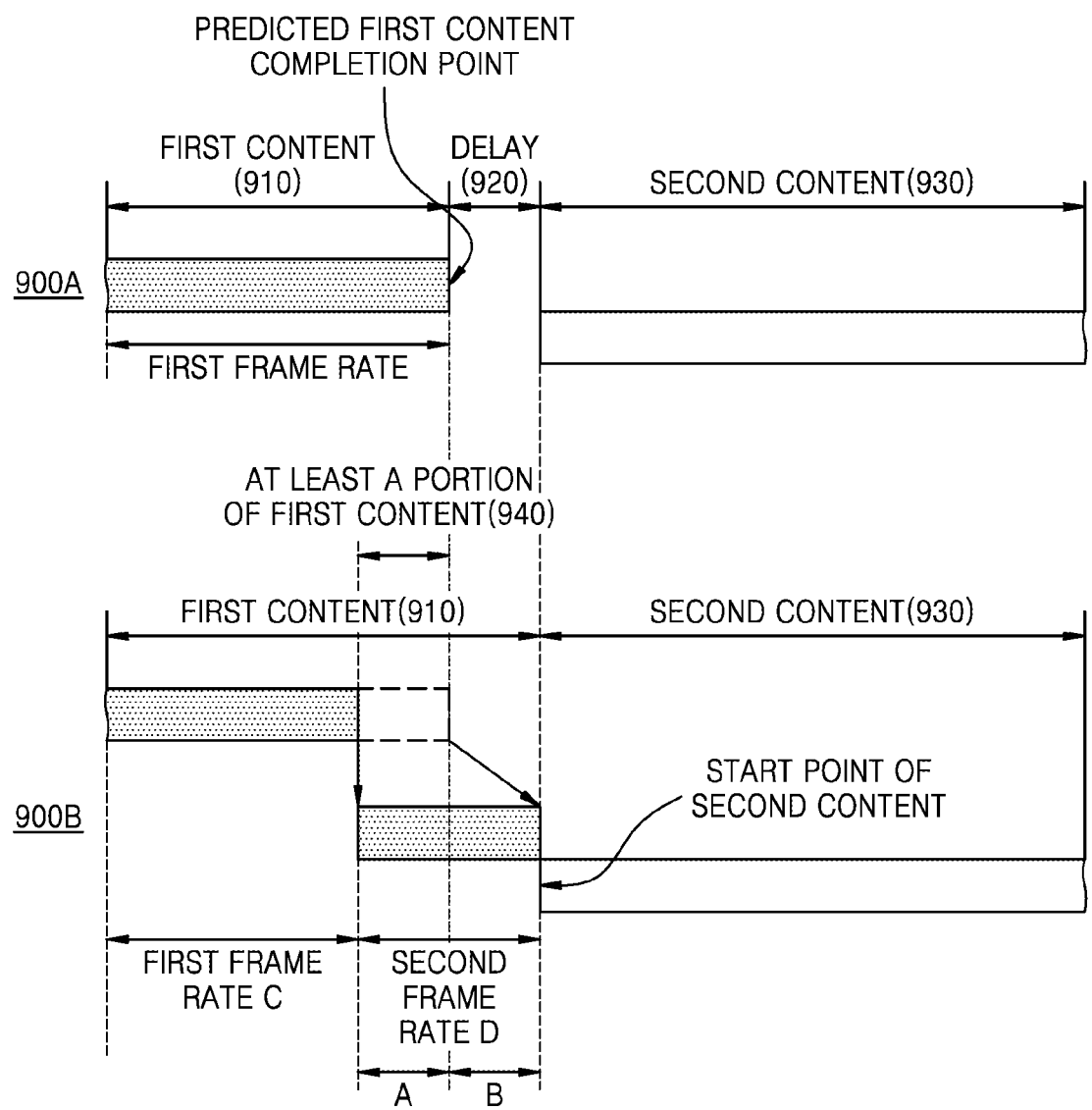
FIG. 9 is a diagram illustrating example conversion of the content illustrated in FIG. 8.

FIG. 9 is a diagram illustrating the content conversion operation illustrated in FIG. 8.

Referring to FIG. 9, 900A indicates a delay when there is no content conversion operation according to an embodiment. That is, referring to FIG. 9, a delay 920 may occur between a predicted completion point of first content 910 and a start point of second content 930.

900B indicates displaying of content according to the content conversion operation according to an embodiment. In 900A, the first content 910 may be displayed at a first frame rate, which is an initial frame rate of the first content 910. However, in 900B, the frame rate of the first content 910 may be adjusted as a second frame rate, during a time corresponding to the delay 920 and a time corresponding to some last sections 940 of the first content 910.

Referring to 900B, the electronic apparatus 100 may determine those last sections 940 of the first content 910.

Also, the electronic apparatus 100 may display frames included in those last sections 940 of the first content at the second frame rate, during the time corresponding to those last sections 940 of the first content 910 and the time corresponding to the delay 920. For example, when the number of frames included in those last sections 940 of the first content 910 is E, the electronic apparatus 100 may determine the second frame rate D of the first content 910 displayed during a time A+B, as below.

The first frame rate: C
The second frame rate: D
The number of frames to be displayed during a section A before adjusting the frame rate: E=A*C
The second frame rate during the time A+B: D=E/(A+B) =(A*C)/(A+B)
Accordingly, A=(B*D)/(C−D)

Here, B, that is, the time after the predicted completion point of the first content 910 before hardware switching is a time occurring during software processing, and is predictable, though not always constant. For example, B may be a fixed value. For example, B may be obtained through learning. For example, B may be obtained when the electronic apparatus 100 is manufactured.

The initial frame rate of the first content, that is, the first frame rate may be obtained by parsing content information. The second frame rate may be set as a predetermined value which is less than that of the first frame rate.

The electronic apparatus 100 may reduce the delay due to the conversion operation between the first content and the second content, by lowering speeds of the frames corresponding to those last sections A of the first content and making the frames displayed for the longer time (A+B).

Figure 10:
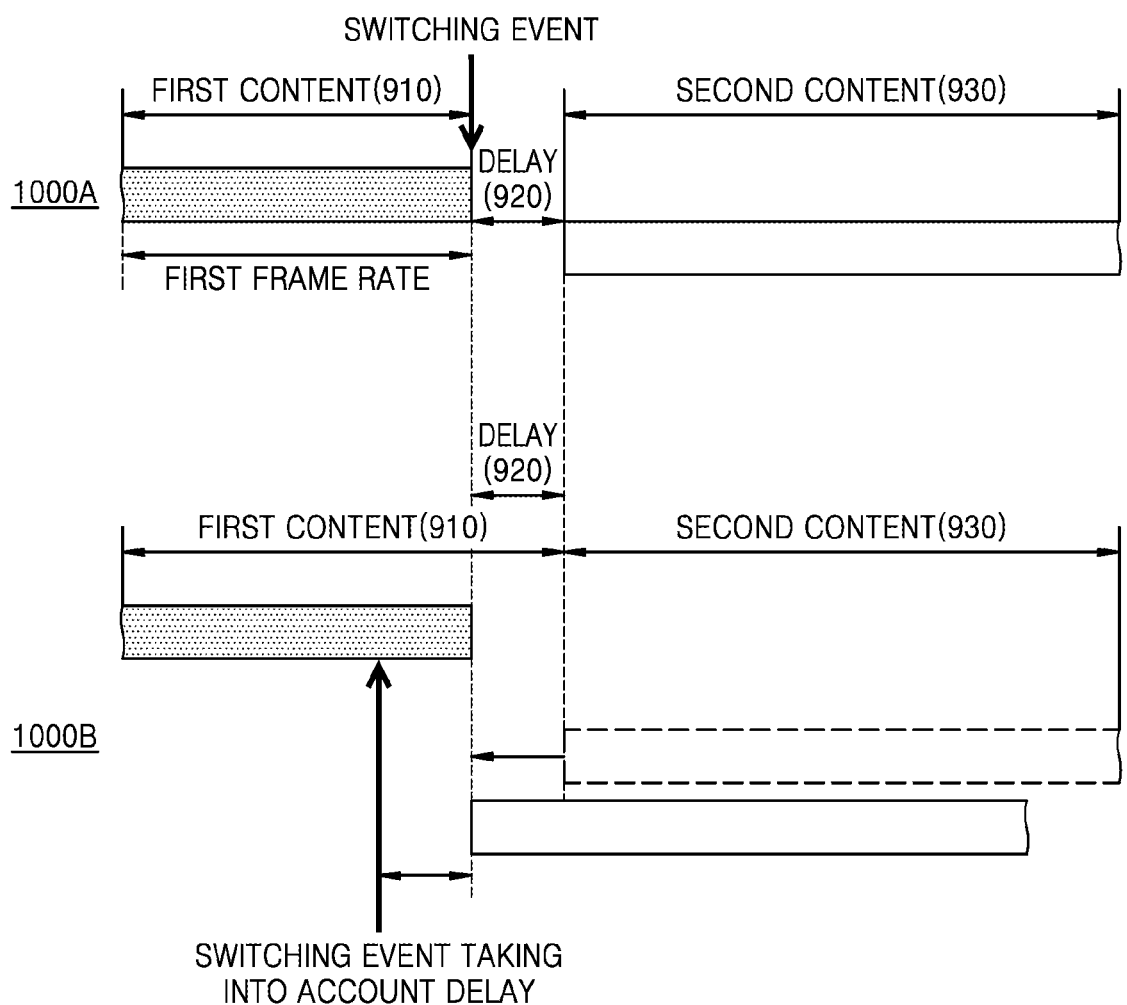
FIG. 10 is a diagram illustrating another example of decreasing a delay when performing a content conversion operation, according to an example embodiment.

FIG. 10 is a diagram illustrating another example of decreasing a delay when performing a content conversion operation, according to an example embodiment.

When a time corresponding to the delay 920 occurring during the conversion of the first content 910 into the second content 930 is predicted, the electronic apparatus 100 may command, in advance, the preparation for displaying the second content 930, by taking into account the time corresponding to the delay 920. Referring to FIG. 10, 1000A indicates a case in which a switching event occurs at a completion point of the first content 910 and the delay 920 occurs, and 1000B indicates a case in which the preparation of the second content 930 is pre-performed by generating a switching event before the completion point of the first content 910, in order to remove the delay 920.

As described above, according to the electronic apparatus 100 and the operating method thereof according to the one or more of the above example embodiments, the replacement content determined based on the ACR operation may be smoothly displayed in the replacement slot.

The method of the present disclosure may be implemented as computer instructions which may be executed by various computer means, and recorded on a computer-readable recording medium. The computer-readable recording medium may include program commands, data files, data structures, or a combination thereof. The program commands recorded on the computer-readable recording medium may be specially designed and constructed for the disclosure or may be known to and usable by one of ordinary skill in a field of computer software. Examples of the computer-readable medium include storage media such as magnetic media (e.g., hard discs, floppy discs, or magnetic tapes), optical media (e.g., compact disc-read only memories (CD-ROMs), or digital versatile discs (DVDs)), magneto-optical media (e.g., floptical discs), and hardware devices that are specially configured to store and carry out program commands (e.g., ROMs, RAMs, or flash memories). Examples of the program commands include a high-level language code that may be executed by a computer using an interpreter as well as a machine language code made by a complier.

It should be understood that the various example embodiments described herein should be considered in a descriptive sense only and not for purposes of limitation. Descriptions of features or aspects within each embodiment should typically be considered as available for other similar features or aspects in other embodiments.

While various example embodiments have been described with reference to the figures, it will be understood by those of ordinary skill in the art that various changes in form and details may be made therein without departing from the spirit and scope as defined by the following claims and their equivalents.

What is claimed is:

1. An electronic apparatus comprising:
a communication interface comprising communication circuitry;
a display;
a memory configured to store one or more instructions; and
a processor configured to execute the one or more instructions stored in the memory, the instructions, when executed by the processor, cause the electronic apparatus to:
transmit, to an external server, information for recognition of content displayed on the display,
receive, from the external server, in response to the transmission of the information for recognition of the content, address information of replacement content to be displayed in a replacement slot including a section between the content and next content displayed next to the content and information on the replacement slot including a length of the replacement slot,
access a content server to download the replacement content based on the address information of the replacement content received from the external server,
parse the replacement content downloaded from the content server to obtain information on a length of the replacement content,
compare the length of the replacement slot received from the external server with the length of the replacement content obtained by parsing the replacement content downloaded from the content server, and
when the length of the replacement slot is not matched with the length of the replacement content, processing the replacement content using one or more frames included in the replacement content, wherein
based on the length of the replacement content being less than the length of the replacement slot, a display time of one or more frames included in the replacement content is increased so that the replacement content is displayed for a period of time corresponding to the length of the replacement slot, and
based on the length of the replacement content being greater than the length of the replacement slot, one or more frames included in the replacement content is periodically removed.

2. The electronic apparatus of claim 1, wherein the removing of one or more frames included in the replacement content comprises removing a number of frames corresponding to a difference between the length of the replacement content and the length of the replacement slot.

3. The electronic apparatus of claim 2, wherein the removed frames comprise frames of B type and frames of P type from among frames of I type, frames of B type, and frames of P type.

4. The electronic apparatus of claim 3, wherein the processor is configured to execute the one or more instructions stored in the memory to cause the electronic apparatus to:
determine the number of frames to be removed based on a predetermined interval,
analyze a predetermined number of frames neighboring the determined number of frames, and
select frames of B type and frames of P type from among frames of I type, frames of B type, and frames of P type, as the frames to be removed, based on a result of the analysis.

5. The electronic apparatus of claim 1, wherein the information for recognition of the content comprises a fingerprint extracted from the content.

6. The electronic apparatus of claim 1, wherein the length of the replacement slot is received from the external server.

7. The electronic apparatus of claim 1, wherein the processor is configured to execute the one or more instructions stored in the memory to cause the electronic apparatus to:
further receive, from the external server, information on time when the replacement content starts to be displayed, and start displaying the replacement content based on the received display time information.

8. The electronic apparatus of claim 1, wherein the processor is configured to execute the one or more instructions stored in the memory to cause the electronic apparatus to:
start displaying the replacement content downloaded, based on display point information received from the external server.

9. A method of operating an electronic apparatus, the method comprising:
transmitting, to an external server, information for recognition of content displayed on a display,
receiving, from the external server, in response to the transmission of the information for recognition of the content, address information of replacement content to be displayed in a replacement slot including a section between the content and next content displayed next to the content and information on the replacement slot including a length of the replacement slot,
accessing a content server to download the replacement content based on the address information of the replacement content received from the external server,
parsing the replacement content downloaded from the content server to obtain information on a length of the replacement content,
comparing the length of the replacement slot received from the external server with the length of the replacement content obtained by parsing the replacement content downloaded from the content server, and
when the length of the replacement slot is not matched with the length of the replacement content, processing the replacement content using one or more frame included in the replacement content, wherein
based on the length of the replacement content being less than the length of the replacement slot, a display time of one or more frames included in the replacement content is increased so that the replacement content is displayed for a period of time corresponding to the length of the replacement slot, and
based on the length of the replacement content being greater than the length of the replacement slot, one or more frames included in the replacement content is periodically removed.

10. The method of claim 9, wherein the removing of one or more frames included in the replacement content comprises:
removing a number of frames corresponding to a difference between the length of the replacement content and the length of the replacement slot.

11. The method of claim 10, wherein the removed frames comprise frames of B type and frames of P type from among frames of I type, frames of B type, and frames of P type.

12. The method of claim 11, further comprising:
determining the number of frames to be removed based on a predetermined interval,
analyzing a predetermined number of frames neighboring the determined number of frames, and
selecting frames of B type and frames of P type from among frames of I type, frames of B type, and frames of P type, as the frames to be removed, based on a result of the analysis.

13. The method of claim 9, wherein the information for recognition of the content comprises a fingerprint extracted from the content.

14. The method of claim 9, wherein the length of the replacement slot is received from the external server.

15. The method of claim 9, further comprising:
further receiving, from the external server, information on time when the replacement content starts to be displayed, and
starting displaying the replacement content based on the received display time information.

16. The method of claim 9, further comprising:
starting displaying the replacement content downloaded, based on display point information received from the external server.

17. A non-transitory computer-readable recording medium having embodied thereon a program which, when executed by a processor, causes an electronic device to:
transmit, to an external server, information for recognition of content displayed on a display,
receive, from the external server, in response to the transmission of the information for recognition of the content, address information of replacement content to be displayed in a replacement slot including a section between the content and next content displayed next to the content and information on the replacement slot including a length of the replacement slot,
access a content server to download the replacement content based on the address information of the replacement content received from the external server,
parse the replacement content downloaded from the content server to obtain information on a length of the replacement content,
compare the length of the replacement slot received from the external server with the length of the replacement content obtained by parsing the replacement content downloaded from the content server, and
when the length of the replacement slot is not matched with the length of the replacement content, process the replacement content using one or more frame included in the replacement content, wherein
based on the length of the replacement content being less than the length of the replacement slot, a display time of one or more frames included in the replacement content is increased so that the replacement content is displayed for a period of time corresponding to the length of the replacement slot, and
based on the length of the replacement content being greater than the length of the replacement slot, one or more frames included in the replacement content is periodically removed.

* * * * *